March 19, 1957  R. E. PHELON ET AL  2,786,154

FLYWHEEL MAGNETO

Filed March 3, 1954

INVENTORS
RUSSELL E. PHELON
JOHN F. MARTIN
BY S. Jay Teller
ATTORNEY

United States Patent Office 2,786,154
Patented Mar. 19, 1957

2,786,154

FLYWHEEL MAGNETO

Russell E. Phelon, Longmeadow, and John F. Martin, Springfield, Mass., assignors to R. E. Phelon Company, Inc., East Longmeadow, Mass., a corporation of Massachusetts Application March 3, 1954, Serial No. 413,804

8 Claims. (Cl. 310—153)

This invention relates to a high tension magneto and, more specifically, to an improved flywheel type magneto for use with an internal combustion engine.

As used herein, the term "flywheel type" is meant to refer to megneto constructions which comprise a rotor or flywheel surrounding non-rotatable or stator structure including the magneto coil and core.

An object of the invention is to provide a flywheel type magneto of simple and economical construction wherein elements of the stator are adapted to cooperate with elements of the flywheel to provide in a first rotated position of the flywheel a magnetic circuit through a coil arm included in the core structure and to provide in a subsequent and adjacent rotated position of the flywheel a magnetic circuit through a shunt arm included in the core structure, the said cooperating elements being adapted to open the first mentioned magnetic circuit during movement between the rotated position and to thereby effect a sudden reduction of the flux in the coil arm which reduction of flux is accelerated by the establishment of the last mentioned magnetic circuit through the shunt arm to the end that the magneto exhibits improved operating characteristics when compared to conventional flywheel type magnetos.

Another object of the invention is to provide a flywheel type magneto which is further characterized by a flywheel and coil and core arrangement permitting application of the magneto to installations where space is limited and wherein conventional flywheel type magnetos cannot ordinarily be applied.

Other objects of the invention will become apparent from the drawing and from the following specification and claims.

In the drawing we have shown in detail a preferred embodiment of the invention, but it will be understood that changes may be made from the construction shown, and that the drawing is not to be construed as defining or limiting the scope of the invention, the claims forming a part of this specification being relied upon for that purpose.

Figure 1:
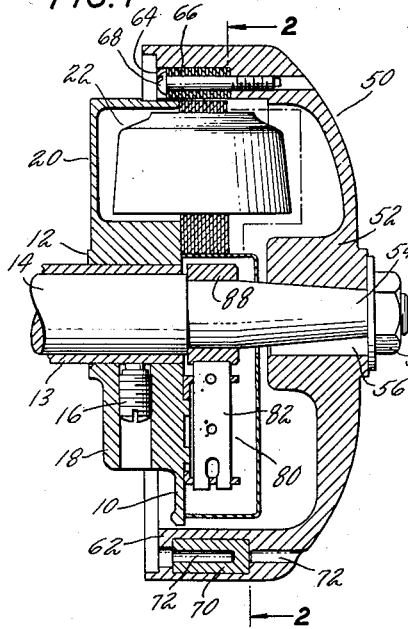
Fig. 1 is a longitudinal vertical sectional view taken along line 1—1 of Fig. 2.

The coil and core structure of the magneto is supported on a substantially circular stator plate or frame 10 having a rearwardly projecting central hub 12 which embraces and is secured to a bearing 13 for a rotatable shaft 14. The shaft 14 may be considered here as a forwardly projecting extension of the crankshaft of the engine with which the magneto is used and in any event the shaft 14 must be rotated in timed relationship with the engine. As shown in the drawing, the stator frame 10 may conveniently be secured in non-rotating relationship with the shaft by a set screw 16 threaded through a rearwardly projecting boss 18 on the frame 10 and engaging the bearing 13. The frame 10 is fabricated from non-magnetic material, such as aluminum, which may conveniently be cast in the form shown.

In such form, the frame is provided with a rearwardly projecting thin-walled boss 20 which encloses a substantial portion of a coil indicated generally by the numeral 22. As will be more fully explained, the coil 22 includes an inner primary winding and an outer secondary winding. The said coil surrounds a substantially radially extending arm 24 forming an integral part of core structure indicated generally by the numeral 26.

The said core structure is formed of magnetic material, such as soft iron, and is preferably in laminated form. The laminations are secured together as by one or more drive screws 27 and the core structure is secured to the front face of the frame 10 as by the screws 29, 29. In addition to the arm 24, the core structure includes a second arm 28 and an interconnecting section 30 which is disposed closely adjacent the shaft-receiving opening in the frame 10. For reasons which will become apparent, the first mentioned arm 24 will sometimes hereinafter be referred to as the coil arm of the core structure while the second mentioned arm 28 will sometimes hereinafter be referred to as the shunt arm of the core structure.

A strong permanent magnet 36 is arranged to extend generally radially along the front face of the frame 10 with its inner end (marked S) engaging the connecting or intermediate section 30 of the core structure 26. The radially outer end (marked N) of the magnet 36 engages a pole piece 38 comprising magnetic material, such as soft iron, preferably of laminated structure. The magnet 36 is held in the aforementioned position by front and rear non-magnetic plates 40, 40 which are secured to the core structure 26 and to the pole piece 38 as by rivets or drive screws 42, 42.

It is important to note that the pole piece 38 is provided with an arcuate pole face 39 which is formed on a radius from the axis of the shaft 14, the said radius being substantially equal to the radius of the circular frame plate 10. It is also important to note that the ends of the coil arm 24 and the shunt arm 28 are also formed with arcuate pole faces 44 and 46, respectively, each being formed on a radius from the axis of the shaft and equal to the radius of pole face 39.

Figure 2:
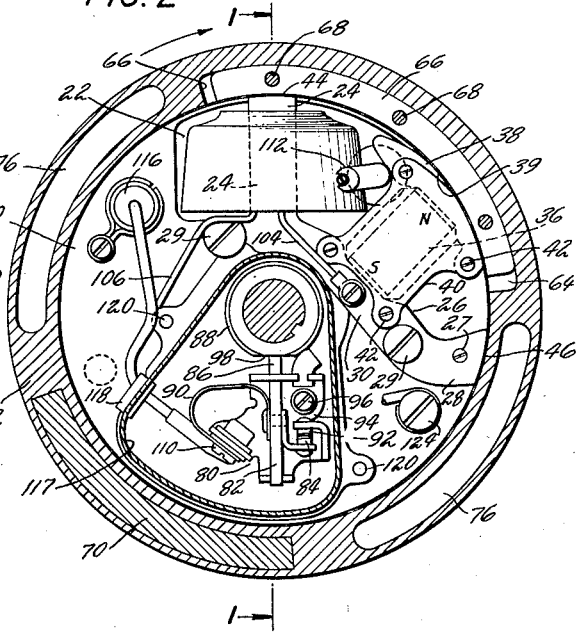
Fig. 2 is a vertical transverse sectional view taken along the line 2—2 of Fig. 1.
Figure 4:
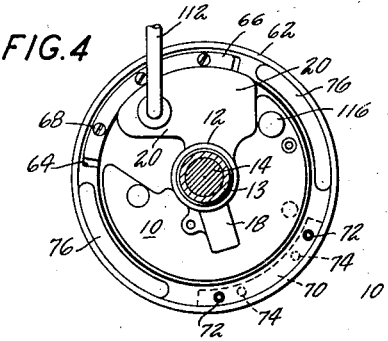
Fig. 4 is a reduced scale rear view of the magneto.

Accordingly, the pole faces 44, 39 and 46 (clockwise order as shown in Fig. 2) are circularly spaced along the periphery of the stator plate 10. The radial center points of the said pole faces 44 and 46 should subtend an angle from the axis of the shaft of less than 180° and it is preferred that the radial center points be included within an angle or arc no greater than 120°. At this point it will serve the further understanding of the invention to consider the magnetic circuits which may be formed by magnetically connecting the pole face 39 to the pole face 44 and to the pole face 46, respectively.

Assuming that a magnetic conductor interconnects the pole faces 39 and 44 and assuming the outer end N of the magnet 36 to constitute the north pole thereof, a magnetite circuit including the coil arm 24 will be completed and flux will flow counterclockwise therein as viewed in Fig. 2. More specifically, flux will flow from the north pole N through the pole piece 38 and conductor to the pole face 44, through the coil arm 24 of the core structure to the intermediate section 30 and to the south pole S. If a magnetic conductor interconnects the pole faces 39 and 46, a magnetic circuit through the shunt arm 28 will be completed and flux will flow clockwise therein. More specifically, flux will flow from the north pole N through the conductor to the pole face 46, through the shunt arm 28 of the core structure to the intermediate section 30 and to the south pole S.

In accord with one important aspect of the invention, a flywheel is arranged to rotate about the aforedescribed stator elements and includes in its structure magnetic conductor means adapted to establish the aforedescribed magnetic circuits through the coil arm and through the shunt arm for the purpose of improving the operating characteristics of flywheel type magnetos. Therefore, a detailed consideration of the flywheel 50 is in order.

The said flywheel is of generally cup-shaped configuration and has a central tapered opening defined by a hub 52 which embraces a forwardly projecting tapered extension 54 on the shaft 14 and which is secured thereto as by a key 56 and a nut 58 threaded on the reduced end 60 of the said shaft. It is prefered that the flywheel be fabricated entirely of non-magnetic material. It has been found that the flywheel may conveniently be formed as shown of die cast aluminum. In any event, the peripheral wall 62 thereof should be non-magnetic and is preferably cast as a cylindrical portion of the flywheel.

The inner surface of the said cylindrical portion or rim of the flywheel radially overlies the rim of the stator plate 10 and the pole faces 44, 39 and 46 in closely spaced relationship. Since the rim of the flywheel is non-magnetic, the relationship it bears to the said pole faces does not serve to establish magnetic circuits in the manner described. However, in accordance with the invention, a cavity or recess 64 is defined in the flywheel rim to open radially inwardly thereof and a magnetic conductor 66 is secured within the said recess. The said conductor comprises magnetic material, such as soft iron, and is preferably provided in laminated form with the laminations held together and the composite structure secured to the flywheel as by drive screws 68, 68. The radially inner face of the conductor 66 is arcuate and is formed on a radius extending from the axis of the shaft 14 and said inner face is located in substantially flush relationship with the radially inner surface of the rim 62 so as to also radially overlie the pole faces 44, 39 and 46 in closely spaced relationship. The weight of the conductor 66 is balanced by a counterweight 70 located within the rim 62 and in substantially diametrically opposed relationship to the said conductor. The counterweight 70 may be variously held in place but as shown the flywheel is cast around it. When the counterweight is cast in place, holes 72, 72 are provided for receiving pins in the mold which serve to locate the said counterweight during casting. In practice, the counterweight is made slightly heavier than the conductor and one or more holes 74 are drilled in the counterweight to obtain exact balance. It should be noted that generally diametrically opposed cavities 76, 76 are formed in the rim of the flywheel between the conductor 66 and the counterweight 70 to reduce the total weight of the flywheel.

As shown in the drawing, the conductor 66 is of sufficient arcuate length to extend between the pole faces 44 and 46 while radially overlying pole face 39. Preferably, the conductor 66 subtends an arc substantially equal to but nevertheless slightly less than the arc subtended by the radial center points of the pole faces 44 and 46.

As will be quite apparent, the conductor is utilized to provide the previously described magnetic circuits through the coil and shunt arms during rotation of the flywheel. In considering this aspect of the invention, it is important to observe that the core structure is arranged according to the direction of flywheel rotation so that the coil arm magneic circuit will be the first to be established. As shown on the drawing, the flywheel rotates in a clockwise direction and, accordingly, the coil arm 24, magnet 36, and shunt arm 28 are arranged in clockwise order of mention. It will be seen that the conductor 66 will bridge the pole faces 44 and 39 to provide a counterclockwise magnetic circuit through the coil arm 34 as the flywheel is rotated through a segment of revolution. In a subsequent overlapping segment of revolution, the conductor extends between the pole faces 44 and 46 to continue the said counterclockwise magnetic circuit through the coil arm and to establish an independent clockwise magnetic circuit through the shunt arm 28. In a subsequent overlaping segment of revolution, the coil arm magnetic circuit is opened and the shunt arm magnetic circuit remains closed. It will be readily understood that immediately upon the coil circuit being opened, all flux flow is directed through the shunt circuit and flow in the coil arm is reduced to zero. In completing the aforesaid magnetic circuits through the core structure, the conductor may be called a bridging connector or "inductor," the latter being a term common to the art for elements of similar construction.

As previously mentioned, the spacing of the centers of pole faces 44 and 46 is preferably no more than 120°. A highly satisfactory arrangement is provided in spacing the centers of pole faces 44 and 39 to subtend an arc of approximately 60° and in spacing the centers of pole faces 39 and 46 to subtend an arc of approximately 45°. This relatively close spacing of the pole faces has two distinct advantages. First, it reduces the necessary arcuate length and weight of the conductor and second, it makes more space available on the stator plate 10 for associated apparatus such as breaker mechanism.

Since the conductor 66 subtends an arc slightly less than the arc (105° in the illustrative example) subtended by the centers of the pole faces 44 and 46, it will be seen that the intermediate segment of revolution, wherein the coil and shunt circuits are provided simultaneously, is quite small while the segments of revolution wherein the coil and shunt circuits are provided individually are relatively large. Accordingly, it may be said that in one rotated position of the flywheel a magnetic circuit is provided through the coil arm and in a subsequent and adjacent rotated position a magnetic circuit is provided through the shunt arm. This arrangement is advantageous in that magnetic flow through the coil arm is reduced to zero very quickly when the flow is shunted. The relatively large segment of rotation wherein the coil circuit is provided permits building peak flow before shunting.

The aforedescribed closing and opening of the magnetic circuits is accomplished in timed relationship to the operation of breaker mechanism 80 which is electrically connected to the coil 22 to generate an ignition spark for the engine once during each rotation of the shaft and flywheel. The particular breaker mechanism shown is fully described in our co-pending application Serial No. 350,-458, filed April 22, 1953, and a detailed description is deemed unnecessary for an understanding of the present invention, it being understood that various other breaker mechanisms may be employed with satisfactory results.

Figure 3:
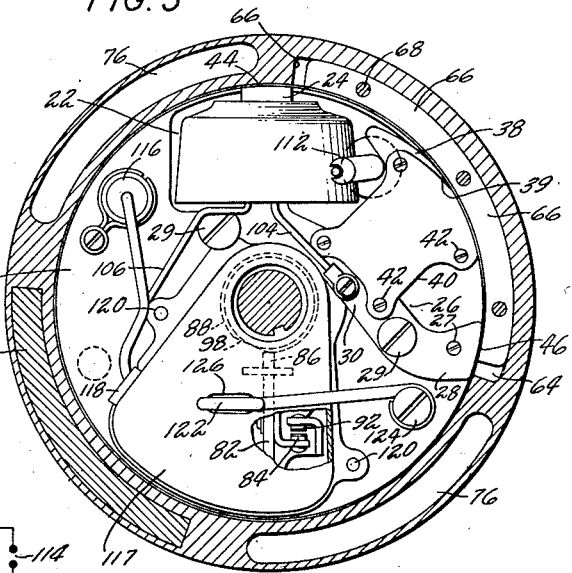
Fig. 3 is a view similar to Fig. 2 but showing the flywheel in a different position and also showing the breaker mechanism cover in elevation.

It should be noted that the breaker mechanism includes a reciprocable shuttle or slide 82 which carries a breaker point 84 and has a projecting end 86 engaging the periphery of a cam 88 which is fixed for rotation with the shaft 14. The shuttle is biased toward the cam by a conductor-spring 90 which is electrically connected to the movable breaker point 84 and urges the same toward engagement with a fixed breaker point 92. The said fixed breaker point is supported by the breaker frame 94 and electrically connected therethrough to ground as by the screw 96 which is threaded to the magneto frame plate 10. The breaker points 84 and 92 are permitted to engage when the projecting upper end 86 of the shuttle engages a flat 98 on the periphery of the cam 88. Thus, the breaker points are engaged for one relatively short interval during each rotation of the cam and shaft 14. As will be seen by comparing Figs. 2 and 3, the "breaker closed" interval occurs while a magnetic circuit is completed through the coil arm of the core structure.

More specifically, the rotated position of the flywheel 50 on the shaft 14 is fixed relative to the cam 88 so that the bridging connector 66 will establish the magnetic circuit through the coil arm 24 before the cam flat 98 is rotated into position for engagement by the top end 86 of the shuttle 82. The particular arrangement is such that the coil circuit is established and magnetic flow reaches a maximum therein before the cam flat engages the shuttle to close the breaker points. The cam flat 98, or reduced diameter portion of the cam, is of sufficient expanse to assure that the said breaker points remain closed until trailing end of the bridging connector 66 has been rotated a few degrees beyond the coil arm pole face 44 to the position shown in Fig. 3. Before reaching the Fig. 3 position, the bridging connector 66 has established the magnetic "short" circuit through the shunt arm 28 of the core structure. The breaker points 84 and 92 remain open, as in the Fig. 3 position, until the magnetic circuit through the coil arm 24 is re-established.

Figure 5:
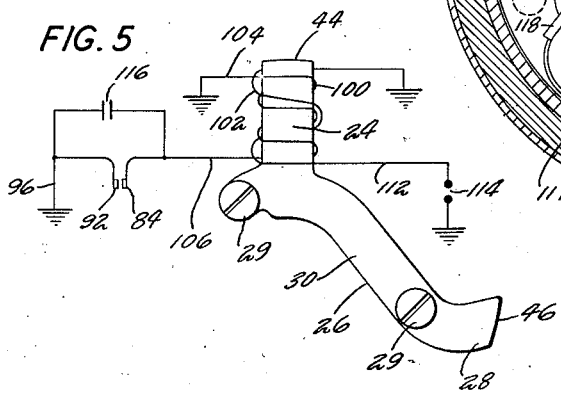
Fig. 5 is a diagram of electrical connections.

The electrical effect of closing and opening a magnetic circuit through the coil arm in the aforedescribed timed relationship with closing and opening the breaker points can be best understood with reference to the diagram of electrical connections shown in Fig. 5. As shown in Fig. 5, the coil 22 comprises a primary coil 100 which is wound upon the coil arm 24 and a secondary coil 102 which is wound about the primary coil. The primary coil may be made up of approximately 165 turns of relatively heavy wire, while the secondary coil may comprise approximately 10,000 turns of relatively fine wire. The primary coil 100 is suitably grounded for instance by being connected to the core structure 26 as indicated at 104. The ungrounded end of the primary coil is connected to the conductor-spring 90 and breaker points by means of an insulated conductor 106 which is connected to the said conductor-spring at the insulated screw 110. The secondary coil 102 has one end which is grounded similarly to the grounded end of the primary coil and has an ungrounded end connected to an insulated conductor 112 which extends to the spark plug 114 of the engine. A condenser 116 is connected in parallel with the breaker points 84 and 92 in accordance with customary practice.

A dust cover 117 is provided for the breaker mechanism this having an insulating grommet 118 in one wall thereof for the wire 106. The cover is located on the plate 10 by pins 120, 120 extending through suitable ears on the cover. A spring 122 pivotally movable on a screw 124 is engageable with a depression 126 in the front wall of the cover for clamping the cover in place. When the cover is to be removed the spring is flexed to disengage the said depression and is then moved pivotally to clear the cover.

It will be readily understood that a high voltage spark may be generated with the aforedescribed apparatus and arrangement thereof. More specifically, a magnetic circuit is completed through the coil arm of the core and flux flow is permitted to build up therewithin before the breaker points are closed. The breaker cam is so positioned as to separate the breaker points a short time after maximum voltage has been established in the primary coil, thus generating a high voltage in the secondary coil which is connected with the spark plug. An unusually high voltage spark is generated by reason of the fact that the magnetic flow is shunted from the coil arm of the core structure into the shunt arm after flux flow has reached a maximum. This shunting or short circuiting accelerates the collapse of flux in the coil arm. Immediately after shunting, the cam opens the breaker points which produces a further collapse of flux in the coil arm and induces high voltage in the secondary of the coil. The condenser not only prevents arcing across the breaker points, but also reverses the direction of current through the primary of the coil and thus supplements the intensity of generation of high voltage in the secondary winding. It is important to note that maximum flux collapse or change is obtained by the use of the shunt circuit without resorting to means for reversing the direction of flow of flux within the core arm.

A very important but less apparent advantage of the invention is incorporated in the physical arrangement of the aforedescribed elements. The core structure is provided in the form shown to accommodate the coil in maximum spaced relationship with the axis of the shaft. In other words, the core and coil structure is arranged upon the stator plate 10 in such a manner that the stator plate may embrace a shaft and shaft bearing of relatively large diameter. While such coil and core arrangement would indicate the necessity of a large diameter flywheel structure, such is not the case in accordance with the present invention. The said flywheel is formed with a relatively thin wall rim portion which accommodates a bridging connector or conductor of sufficiently large cross-sectional area to offer little reluctance to the flow of magnetic flux. In prior flywheel magneto structures, the flywheel has had to accommodate large and heavy magnets and associated apparatus and, therefore, when the internal coil and core structure was spaced a substantial distance from the axis of the shaft, the flywheels were of undesirably large diameter.

We claim as our invention:

1. In a flywheel magneto for an internal combustion engine the combination comprising, a rotatable shaft, a stationary core structure adjacent said shaft including first and second arms having pole faces which are circularly spaced from each other and which are equidistant from the shaft axis, primary and secondary coils surrounding said first arm, a permanent magnet having one end engaging said core structure and having means on the other end defining a pole face between said arms and at said equal distance from the shaft axis, a rotatable flywheel secured to said shaft, and a magnetic conductor secured to said flywheel to overlie certain of the said pole faces in successive adjacent rotated positions of the flywheel which include a first and a second position, the said magnetic conductor in said first rotated position overlying the pole face of the first arm and said magnet pole face to provide a magnetic circuit through the magnet and through said first arm, and said magnetic conductor in moving to the second rotated position being separated from the pole face of the first arm so as to open the aforesaid magnetic circuit and to thereby effect a sudden reduction of the flux in said first arm and through the coils, and the said magnetic conductor in said second rotated position overlying said magnet pole face and the pole face of the second arm to provide a magnetic shunt circuit through the magnet and through the said second arm which magnetic shunt circuit accelerates the said reduction of flux in said first arm and through the coils.

2. In a flywheel magneto for an internal combustion engine the combination comprising, a rotatable shaft, a stationary core structure adjacent said shaft including a first arm extending substantially radially outwardly from said shaft and having primary and secondary coils surrounding the same and including a second arm circularly spaced from said first arm within an arc of no more than 120°, said arms having pole faces which are equidistant from the shaft axis, a permanent magnet extending in generally radial relationship to said shaft and having its inner end engaging said core structure between said arms and having means on its outer end defining a pole face within said arc and at said equal distance from the shaft axis, a rotatable flywheel secured to said shaft and having a rim surrounding said core structure, and a magnetic conductor secured to said flywheel to overlie certain of the said pole faces in successive adjacent rotated positions of the flywheel which include a first and a second position, the said magnetic conductor in said first rotated position overlying the pole face of the first arm and said magnet pole face to provide a magnetic circuit through the magnet and through said first arm, and said magnetic conductor in moving to the second rotated position being separated from the pole face of the first arm so as to open the aforesaid magnetic circuit and to thereby effect a sudden reduction of the flux in said first arm and through the coils, and the said magnetic conductor in said second rotated position overlying said magnet pole face and the pole face of the second arm to provide a magnetic shunt circuit through the magnet and through the said second arm which magnetic shunt circuit accelerates the said reduction of flux in said first arm and through the coils.

3. A flywheel magneto for an internal combustion engine comprising in combination, a rotatable shaft, a stationary core structure adjacent said shaft including first and second arms having pole faces which are equidistant from the shaft axis and which are circularly spaced from each other within an arc of no more than 120°, primary and secondary coils surrounding said first arm, a permanent magnet having one end engaging said core structure between said arms and having means on the other end defining a pole face within said arc and at said equal distance from the shaft axis, a rotatable flywheel secured to said shaft and having a rim surrounding said core structure, a magnetic conductor secured to said rim to radially overlie certain of the said pole faces in successive adjacent rotated positions of the flywheel which include a first and a second position, the said magnetic conductor in said first rotated position overlying the pole face of the first arm and said magnet pole face to provide a magnetic circuit through the magnet and through said first arm, and said magnetic conductor in moving to the second rotated position being separated from the pole face of the first arm so as to open the aforesaid magnetic circuit and to thereby effect a sudden reduction of the flux in said first arm and through the coils, and the said magnetic conductor in said second rotated position overlying said magnet pole face and the pole face of the second arm to provide a magnetic shunt circuit through the magnet and through the said second arm which magnetic shunt circuit accelerates the said reduction of flux in said first arm and through the coils, and breaker mechanism including a pair of points operatively associated with said shaft to be engaged when a magnetic circuit is provided through said first arm and to be disengaged when a magnetic circuit is provided through said second arm.

4. A flywheel magneto for an internal combustion engine comprising in combination, a rotatable shaft, a stationary core structure including a coil arm, and a shunt arm which are circularly spaced within an arc of no more than 120° and which have pole faces equidistant from the shaft axis, primary and secondary coils surrounding said coil arm, a permanent magnet having one end engaging said core structure between said arms and having means on the other end defining a pole face within said arc and at said equal distance from the shaft axis, a rotatable flywheel secured to said shaft, and an arcuate magnetic conductor secured to said flywheel to overlie said pole faces in rotated positions of said flywheel, said conductor being of sufficient arcuate length to overlie the magnet pole face with its ends disposed adjacent the pole faces of said arms to simultaneously provide independent magnetic circuits through the magnet and through said arms and whereby in one direction of rotation of the flywheel a magnetic circuit is provided through the magnet and through said coil arm prior to establishing a magnetic shunt circuit through the magnet and through said shunt arm which shunt circuit remains closed after the circuit through said coil arm is opened to thereby accelerate the reduction of flux in said coil arm and said coils.

5. A flywheel magneto for an internal combustion engine comprising in combination, a rotatable shaft, a stationary core structure including a coil arm extending substantially radially outwardly from said shaft and including a shunt arm both of which arms have pole faces which are equidistant from the shaft axis and which are circularly spaced within an arc of no more than 120°, primary and secondary coils surrounding said coil arm, a permanent magnet having one end engaging said core structure between said arms and having means on the other end defining a pole face within said arc and at said equal distance from the shaft axis, a rotatable flywheel secured to said shaft and having a rim surrounding said core structure, and an arcuate magnetic conductor secured to said rim to radially overlie said pole faces in rotated positions of said flywheel, said conductor being of sufficient arcuate length to substantially subtend said arc whereby said conductor will simultaneously provide independent magnetic circuits through the magnet and through said arms and whereby in one direction of rotation of the flywheel a magnetic circuit is provided through the magnet and through said coil arm prior to establishing a magnetic circuit through the magnet and through said shunt arm which last mentioned circuit remains closed after the circuit through said coil arm is opened to thereby accelerate the reduction of flux in said coil arm and said coils.

6. A flywheel magneto for an internal combustion engine comprising in combination, a rotatable shaft, a stationary core structure including a coil arm extending substantially radially outwardly from said shaft and including a shunt arm both of which arms have pole faces which are equidistant from the shaft axis and which are circularly spaced within an arc of no more than 120°, primary and secondary coils surrounding said coil arm, a permanent magnet having one end engaging said core structure between said arms and having means on the other end defining a pole face within said arc and at said equal distance from the shaft axis, a rotatable flywheel secured to said shaft and having a rim surrounding said core structure, an arcuate magnetic conductor secured to said rim to radially overlie said pole faces in rotated positions of said flywheel, said conductor being of sufficient arcuate length to substantially subtend said arc whereby said conductor will simultaneously provide independent magnetic circuits through the magnet and through said arms and whereby in one direction of rotation of the flywheel a magnetic circuit is provided through the magnet and through said coil arm prior to establishing a magnetic circuit through the magnet and through said shunt arm which last mentioned circuit remains closed after the circuit through said coil arm is opened to thereby accelerate the reduction of flux in said coil arm and coils, and breaker mechanism including a pair of points operatively associated with said shaft to be engaged after a magnetic circuit is provided through said coil arm and to be disengaged after a magnetic circuit is provided through said shunt arm and after the magnetic circuit through said coil arm is opened.

7. In a flywheel magneto for an internal combustion engine, the combination of a rotatable shaft, a stator surrounding said shaft including a core structure located adjacent said shaft and comprising a first arm extending substantially radially outwardly from the shaft and having primary and secondary coils surrounding the same and comprising a second arm circularly spaced from the said first arm, said arms having pole faces which are equidistant from the shaft axis, a permanent magnet extending in generally radial relationship to said shaft and having its inner end engaging said core structure between said arms, and having a pole face on its outer end at said equal distance from the shaft axis, a rotatable flywheel secured to said shaft including a generally cylindrical non-magnetic rim surrounding said core structure and having a recess along its inner surface on one side thereof and a counterweight secured within said rim in substantially opposed relationship to said recess, and a magnetic conductor secured within said recess to radially overlie said pole faces in rotated positions of said flywheel, said conductor being of sufficient length to simultaneously overlie the pole face of said magnet and one of the pole faces of said core structure in one rotated position of the flywheel and to simultaneously overlie the pole face of the said magnet and the other pole face of the said core structure in an adjacent rotated position of the flywheel.

8. In a flywheel magneto for an internal combustion engine, the combination of a rotatable shaft, a stator surrounding said shaft including a core structure located adjacent the shaft and comprising a first arm extending substantially radially outwardly from the shaft and having primary and secondary coils surrounding the same and comprising a second arm circularly spaced from the said first arm within an arc of no more than 120°, said arms having pole faces which are equidistant from the shaft axis, a permanent magnet extending in generally radial relationship to the shaft and having its inner end engaging said core structure between said arms and having a pole face on its outer end located within said arc and at said equal distance from the shaft axis, a rotatable flywheel secured to said shaft including a generally cylindrical non-magnetic rim surrounding said core structure and having a recess along its inner surface on one side thereof and a counterweight within said rim in substantially opposed relationship to said recess, and a magnetic conductor secured within said recess to radially overlie said pole faces in rotated positions of the said flywheel, said conductor being of sufficient length to substantially subtend said arc whereby said conductor will simultaneously overlie the pole face of said magnet and one of the pole faces of the said core structure in one rotated position of the flywheel and will simultaneously overlie the pole face of said magnet and the other pole face of said core structure in an adjacent rotated position of the flywheel.

References Cited in the file of this patent

UNITED STATES PATENTS

| | | |
|---|---|---|
| 1,904,308 | Harmon | Apr. 18, 1933 |
| 2,498,860 | Luttmer | Feb. 28, 1950 |
| 2,583,466 | Brownlee | Jan. 22, 1952 |